US010097983B2

United States Patent
Harada et al.

(10) Patent No.: US 10,097,983 B2
(45) Date of Patent: Oct. 9, 2018

(54) RADIO BASE STATION, USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 50 days.

(21) Appl. No.: 15/032,340

(22) PCT Filed: Oct. 22, 2014

(86) PCT No.: PCT/JP2014/078092
§ 371 (c)(1),
(2) Date: Apr. 27, 2016

(87) PCT Pub. No.: WO2015/064443
PCT Pub. Date: May 7, 2015

(65) Prior Publication Data
US 2016/0277913 A1    Sep. 22, 2016

(30) Foreign Application Priority Data
Oct. 31, 2013   (JP) .................................. 2013-227341

(51) Int. Cl.
*H04W 8/00*    (2009.01)
*H04L 5/00*    (2006.01)
(Continued)

(52) U.S. Cl.
CPC ........... *H04W 8/005* (2013.01); *H04L 5/0062* (2013.01); *H04W 72/042* (2013.01); *H04W 72/048* (2013.01); *H04W 92/18* (2013.01)

(58) Field of Classification Search
CPC . H04W 8/005; H04W 72/042; H04W 72/048; H04W 92/18; H04L 5/0062
See application file for complete search history.

(56) References Cited

U.S. PATENT DOCUMENTS

| 2011/0268101 A1 | 11/2011 | Wang et al. |
| 2013/0010618 A1 | 1/2013 | Wang et al. |

(Continued)

FOREIGN PATENT DOCUMENTS

| JP | 2013529416 A | 7/2013 |
| WO | 2013006652 A1 | 1/2013 |

OTHER PUBLICATIONS

International Search Report issued in corresponding application No. PCT/JP2014/078092 dated Jan. 27, 2015 (2 pages).

(Continued)

*Primary Examiner* — Luat Phung
(74) *Attorney, Agent, or Firm* — Osha Liang LLP

(57) ABSTRACT

The present invention is designed to prevent producing inter-symbol interference against normal uplink communication in collision-type D2D discovery during inter-terminal direct communication. A radio base station can communicate with a user terminal that can execute inter-terminal direct communication, and has a control section that configures a D2D discovery resource area by allocating a type 2 discovery resource area immediately after a type 1 discovery resource area in a row, and a transmission section that transmits allocation information of the D2D discovery resource area.

12 Claims, 9 Drawing Sheets

(51) Int. Cl.
*H04W 72/04* (2009.01)
*H04W 92/18* (2009.01)

(56) References Cited

U.S. PATENT DOCUMENTS

2015/0099514 A1* 4/2015 Sartori ................. H04W 8/005
                                                              455/434
2016/0277913 A1* 9/2016 Harada ................. H04W 92/18

OTHER PUBLICATIONS

Written Opinion of the International Searching Authority issued in corresponding application No. PCT/JP2014/078092 dated Jan. 27, 2015 (3 pages).
Intel Corporation, "On Resource Allocation and System Operation for D2D Discovery"; 3GPP TSG RAN WG1 Meeting #74bis, R1-134141; Guangzhou, China; Oct. 7-11, 2013 (10 pages).
ASUSTeK, "Method of resource allocation for D2D discovery"; 3GPP TSG RAN WG1 Meeting #74bis, R1-134638; Guangzhou, China; Oct. 7-11, 2013 (9 pages).
Intel Corporation, "Type 2B resource allocation for D2D discovery"; 3GPP TSG-RAN2 Meeting #84, R2-134287; San Francisco, USA; Nov. 11-15, 2013 (3 pages).
Balazs Bertenyi, "Key drivers for LTE success: Services Evolution"; 3GPP Seminar, LTE Asia; Sep. 6, 2011 (15 pages).
Extended European Search Report issued in corresponding European Application No. 14858425.3, dated May 30, 2017 (11 pages).
NTT Docomo, Inc; "On Resource Allocation and Timing of Type 2B Discovery"; 3GPP TSG RAN WG1 Meeting #78, R1-143229; Dresden, Germany; Aug. 18-22, 2014 (8 pages).
Office Action issued in the counterpart Japanese Patent Application No. 2013-227341, dated Aug. 15, 2017 (8 pages).
Office Action issued in the counterpart Japanese Patent Application No. 2013-227341, dated Feb. 13, 2018 (5 pages).

* cited by examiner

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In LTE (Long Term Evolution) and successor systems of LTE (referred to as, for example, "LTE-advanced," "FRA (Future Radio Access)," "4G," etc.), D2D (Device to Device) technology is under study, whereby user terminals communicate with each other directly, without involving radio base stations (see, for example, non-patent literature 1).

In inter-terminal direct communication (D2D communication), user terminals carry out D2D discovery to find other user terminals that are communicable. In D2D discovery, the network allocates periodic uplink resource groups as D2D discovery resources, semi-statically. The user terminals allocate discovery signals to D2D discovery resources and transmit them. Also, the user terminals find other communicable user terminals by receiving discovery signals transmitted from other user terminals.

CITATION LIST

Non-Patent Literature

Non-Patent Literature 1: "Key Drivers for LTE Success: Services Evolution," 2011 September, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF INVENTION

Technical Problem

Under D2D discovery, type 1 (collision-type) discovery and type 2 (non-collision-type) discovery are under study, depending on the method of specifying the resources for transmitting discovery signals.

Type 1 (collision-type) discovery provides support even for user terminals that are in RRC idle mode. However, since, there is a problem with type 1 discovery that there is a threat of producing inter-symbol interference (ISI) against normal uplink communication because user terminals in RRC idle mode transmit discovery signals later than the timings managed on the radio base station side.

The present invention has been made in view of the above, and it is therefore an object of the present invention to provide a radio base station, a user terminal and a radio communication method which can prevent producing inter-symbol interference against normal uplink communication in collision-type D2D discovery during inter-terminal direct communication.

Solution to Problem

The radio base station of the present invention provides a radio base station that can communicate with a user terminal that can execute inter-terminal direct communication, and this radio base station has a control section that configures a D2D discovery resource area by allocating a type 2 discovery resource area immediately after a type 1 discovery resource area in a row, and a transmission section that transmits allocation information of the D2D discovery resource area.

Advantageous Effects of Invention

According to the present invention, it is possible to prevent producing inter-symbol interference against normal uplink communication in collision-type D2D discovery during inter-terminal direct communication.

DESCRIPTION OF EMBODIMENTS

Figure 1:
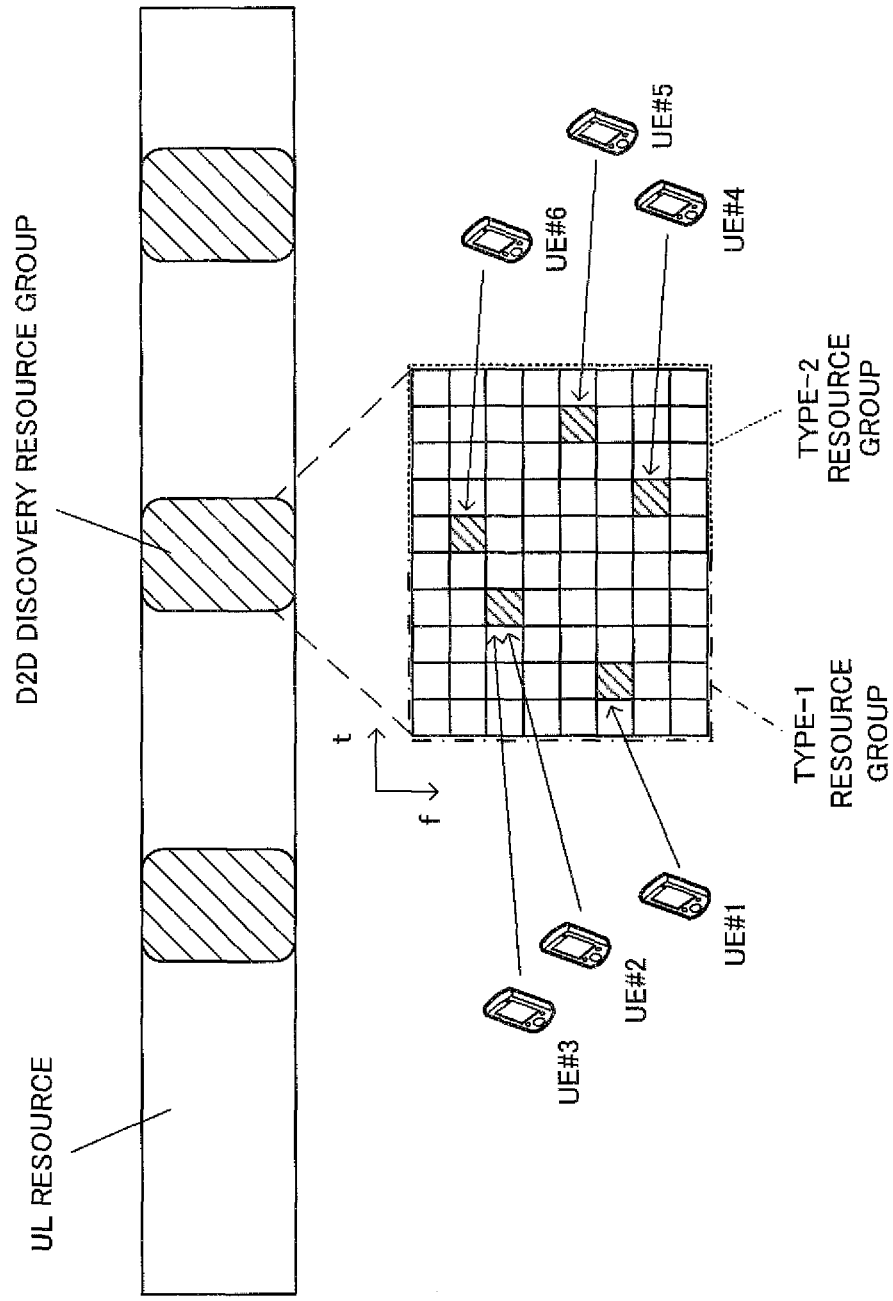
FIG. 1 is a conceptual diagram of D2D discovery resources.

Now, an embodiment of the present invention will be described below in detail with reference to the accompanying drawings. FIG. 1 is a conceptual diagram of D2D discovery resources. As shown in FIG. 1, a periodic uplink (UL) resource group is allocated, semi-statically, as a D2D discovery resource group. In one period of allocation, the D2D discovery resources are divided into time-frequency resources. Individual resource blocks that neighbor each other in two-dimensional directions, namely in the frequency direction and the time direction, are formed with, for example, PRB (Physical Resource Block) pairs.

As shown in FIG. 1, a D2D discovery resource group is formed by including a type 1 resource group and a type 2 resource group. The type 1 resource group and the type 2 resource group are orthogonal to each other.

In type 1 discovery, the network reports the resource group (the type 1 resource group in FIG. 1) in which discovery signals can be transmitted, to user terminals, and from this, each user terminal randomly determines the transmission resource for the subject terminal. In type 1 discovery, each user terminal selects the transmission resource randomly, and therefore there is a threat that the transmission resources collide between user terminals. Consequently, type 1 discovery is also referred to as "collision-type." For example, in FIG. 1, the transmission resource collides between user terminals UE #2 and UE #3.

In type 2 discovery, the network reports the resources for transmitting discovery signals, which are selected from the type 2 resource group, on a per user terminal basis, and each user terminal transmits the discovery signal in the specified transmission resource. In type 2 discovery, the network specifies the transmission resource for use by each user terminal, so that there is no collision of transmission resources between user terminals. Consequently, type 2 discovery is also referred to as "non-collision-type."

In D2D discovery, the inability to discover terminals regardless of the mode of connection of the terminals that are to be discovered leads to severely limiting the situation where the service can be applied, and therefore it is preferable to support not only user terminals that are in connected mode with the network (CONNECTED UE), but also user terminals in idle mode (IDLE UE) as well.

Type 2 discovery necessitates UE-specific allocation of D2D resources, and therefore the mode of connection between user terminals and the network needs to be RRC connected mode (RRC_CONNECTED). On the other hand, in type 1 discovery, as long as the type 1 resource group is broadcast, RRC idle mode (RRC_IDLE) suffices for the mode of connection between user terminals and the network.

Figure 2A:
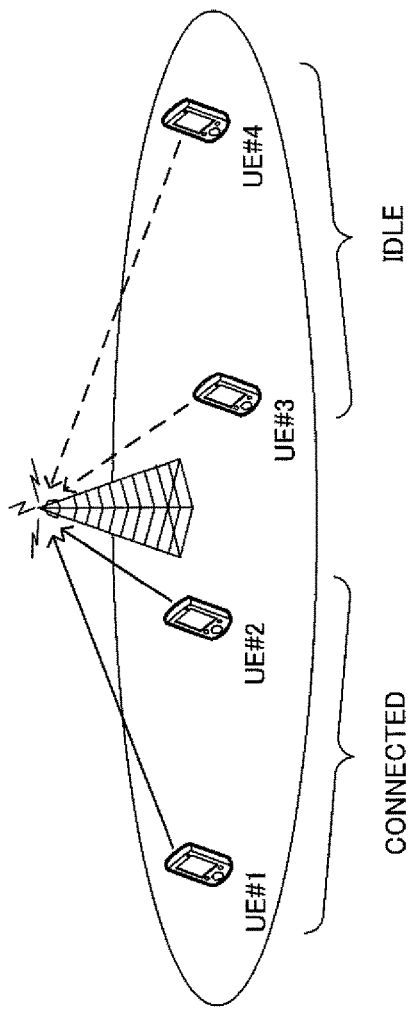
FIG. 2A is a diagram to show the states of user terminals in a cell.

FIG. 2 provides diagrams to explain the timings in which, in D2D discovery, user terminals in RRC connected mode and user terminals in RRC idle mode transmit discovery signals. As shown in FIG. 2A, in a cell formed by a radio base station, user terminal UE #1 and user terminal UE #2 in RRC connected mode, and user terminal UE #3 and user terminal UE #4 in RRC idle mode are present.

In FIG. 2A, user terminal UE #1 is on the cell edge, and user terminal UE #2 is near the radio base station. User terminal UE #1 is in a location that is more distant from the radio base station than where user terminal UE #2 is, and therefore a gap is present between the timings a downlink signal from the radio base station is received in each user terminal. Also, when user terminal UE #1 and user terminal UE #2 transmit uplink signals at the same timing, a gap is produced again between the timings the uplink signals from the user terminals are received in the radio base station.

In order to maintain the orthogonality of signals between the user terminals, it is necessary to coordinate the timing to receive the uplink signal from each user terminal in the radio base station. In order to realize this, timing advance (TA) control, in which the radio base station adjusts the transmission timings of the user terminals, is necessary.

Figure 2B:
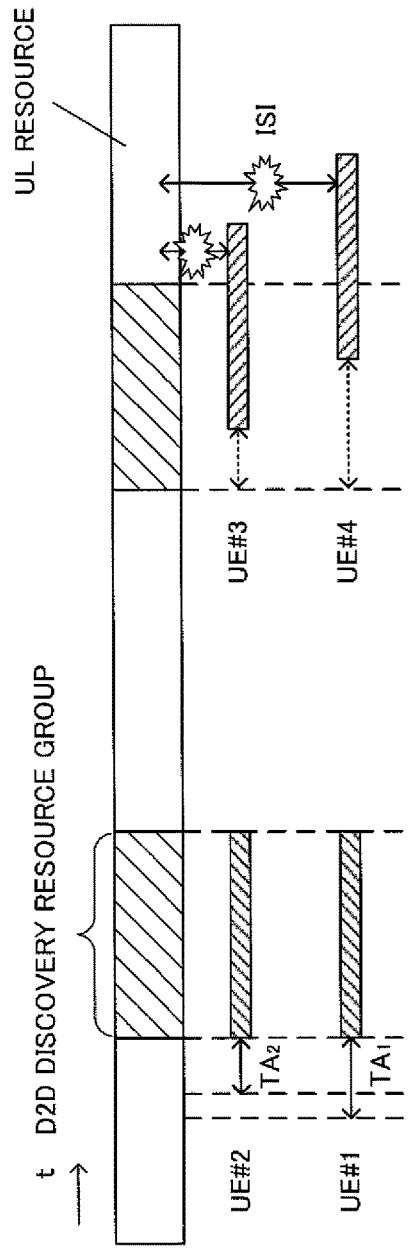
FIG. 2B is a diagram to explain the timings in which, in D2D discovery, user terminals in RRC connected mode and user terminals in RRC idle mode transmit discovery signals.

In TA control, the radio base station reports timing advance values to user terminals. In FIG. 2B, $TA_1$ is reported to user terminal UE #1 as the timing advance value, and $TA_2$ is reported to user terminal UE #2 as the timing advance value. Each subject terminal starts transmission based on this timing advance value, so that the timings in which the discovery signals transmitted from user terminal UE #1 and user terminal UE #2 arrive at the radio base station match.

Meanwhile, the radio base station cannot report timing advance values to user terminal UE #3 and user terminal UE #4 in RRC idle mode. Consequently, user terminal UE #3 and user terminal UE #4 in RRC idle mode transmit discovery signals by using D2D discovery resources, without TA control, or without having adequate TA values that suit their current conditions. Consequently, as shown in FIG. 2B, from user terminal UE #3 and user terminal UE #4 in RRC idle mode, discovery signals are transmitted later than the timings controlled on the radio base station side.

In this case, the discovery signals transmitted in subframe times contained in the D2D discovery resources partly overlap subframe times contained in normal uplink resources, due to propagation delays, timing errors and so on, and therefore there is a threat that the discovery signals give interference and produce inter-symbol interference.

The present inventors have found out a D2D discovery resource reporting method, in which, when support is provided for user terminals in RRC idle mode in D2D discovery, inter-symbol interference against normal uplink communication is prevented from being produced, by always arranging a type 2 resource group immediately after a type 1 resource group.

Now, the method of reporting D2D discovery resources will be described below in detail.

FIRST EXAMPLE

With a first example, the method of allocating a type 1 discovery resource area and a type 2 discovery resource area in a D2D discovery resource area will be described.

Figure 3A:
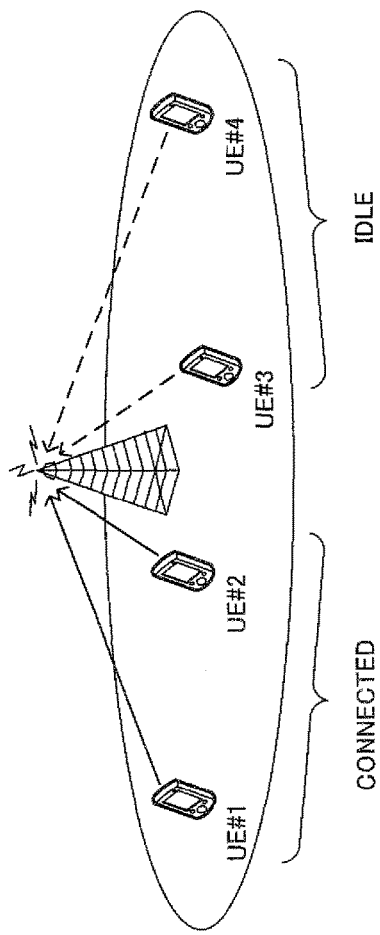
FIG. 3A is a diagram to show the states of user terminals in a cell.
Figure 3B:
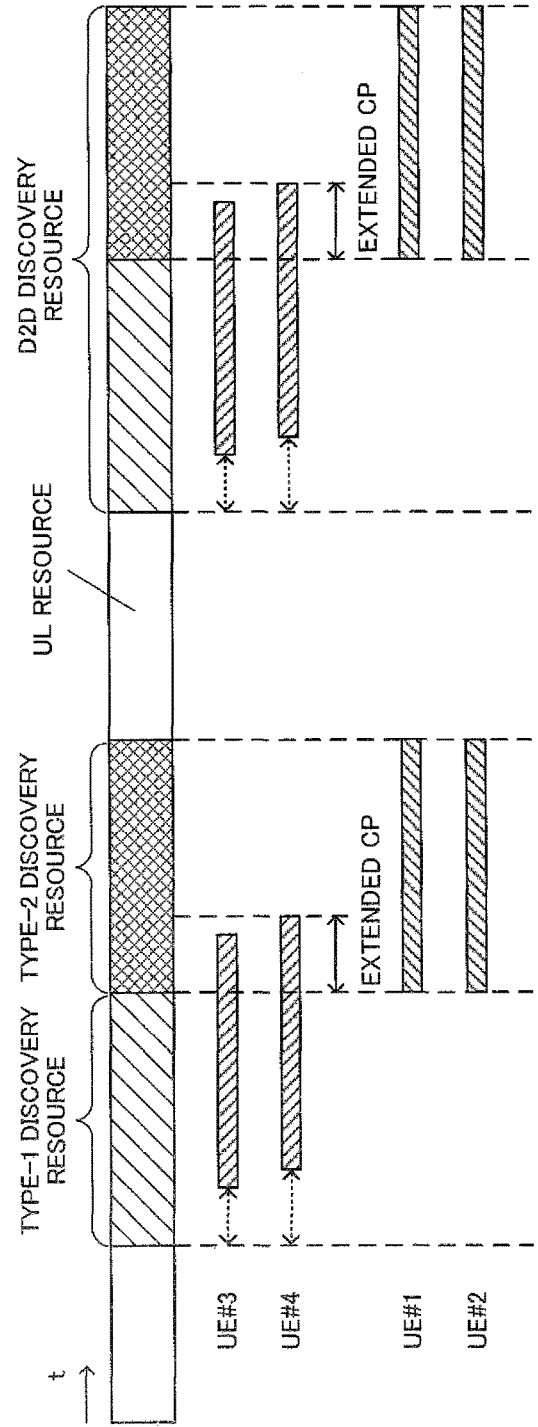
FIG. 3B is a diagram to explain the allocation of a type 1 discovery resource area and a type 2 discovery resource area in a periodic D2D discovery resource area.

Similar to FIG. 2A, FIG. 3A is a diagram to show the states of user terminals in a cell, and FIG. 3B is a diagram to explain the allocation of type 1 discovery resource areas and type 2 discovery resource areas in periodic D2D discovery resource areas.

As shown in FIG. 3A, in a cell formed by a radio base station, user terminal UE #1 and user terminal UE #2 in RRC connected mode and user terminal UE #3 and user terminal UE #4 in RRC idle mode are present.

There is a possibility that, during type 1 discovery, the user terminals in RRC idle mode transmit discovery signals without TA control. Consequently, when uplink sources for normal uplink communication are arranged immediately after the type 1 discovery resource area, there is a threat that the discovery signals transmitted in subframe times contained in the type 1 discovery resources partly overlap subframe times contained in the normal uplink resources, due to propagation delays, timing errors and so on, and produce inter-symbol interference.

On the other hand, since type 2 discovery applies only to user terminals in RRC connected mode, it is possible to control the timings to receive the discovery signals in the radio base station by means of TA control.

So, as shown in FIG. 3B, in a D2D discovery resource area, which is arranged periodically in uplink resources, a type 2 discovery resource area is always allocated immediately after a type 1 discovery resource area, in a row. By this means, even when propagation delays and timing errors are produced in type 1 discovery, their time is normally shorter than the time of the type 2 discovery resource area, so that discovery signals transmitted in subframe times contained in the type 1 resources do not overlap subframe times contained in normal uplink resources. Consequently, no inter-symbol interference is produced against normal uplink communication.

Furthermore, in the type 2 discovery resources, it is possible to prevent inter-symbol interference from discovery signals transmitted in type 1 discovery, by using extended cyclic prefixes (extended CPs).

In this case, the radio base station configures extended cyclic prefixes in one or a plurality of OFDM (Orthogonal Frequency-Division Multiplexing) symbols at the beginning of the subframe set constituting the type 2 discovery resources.

Alternatively, when a user terminal that executes type 2 discovery (type 2 UE) has an index of a UE-specific discovery signal transmission resource in the type 2 discovery resources (in particular, the index of the resource of the first transmission timing in the type 2 discovery resources) from the radio base station, the user terminal may configure extended cyclic prefixes in one or a plurality of OFDM (Orthogonal Frequency-Division Multiplexing) symbols at the beginning of the subframe set constituting the type 2 discovery resources.

Here, type 2 discovery resources using extended cyclic prefixes will be described. Type 2 discovery resources are formed with a plurality of subframes. Each subframe is formed with a plurality of OFDM symbols including cyclic prefixes. One subframe is formed with two slots. Each slot is formed with a plurality of OFDM symbols, and a cyclic prefix is attached to the top of each OFDM symbol. A cyclic prefix is a copy of an end portion of an OFDM symbol, having a length of a guard interval.

In the event of normal cyclic prefixes, seven OFDM symbols are arranged in one slot. The CP length in the first OFDM symbol is 5.1 [μs], and the CP length in second and subsequent OFDM symbols is 4.7 [μs].

In the event of extended cyclic prefixes, six OFDM symbols are arranged in one slot. The CP length in each OFDM symbol is 16.7 [μs]. In this way, in extended cyclic prefixes, the CP length is configured longer than in normal cyclic prefixes.

A user terminal cuts off, from the top of each OFDM symbol's receiving timing, the signal over length of the CP length, and uses the remaining portion for detection. Consequently, if the delay of a discovery signal that is transmitted in a subframe time contained in the type 1 discovery resources is shorter than the CP length of the extended cyclic prefix in the first subframe that is contained in the type 2 discovery resources, there is no impact on the detection of discovery signals in type 2 discovery.

In the example shown in FIG. 3B, user terminal UE #3 and user terminal UE #4 in RRC idle mode transmit discovery signals in subframe times contained in the type 1 discovery resources. However, since TA control is not executed, the discovery signals transmitted in subframe times contained in the type 1 discovery resources partly overlap subframe times contained in the type 2 discovery resources, due to propagation delays, timing errors and so on.

However, this partly-overlapping portion is shorter than the CP length of the extended cyclic prefix in the first subframe contained in the type 2 discovery resources. User terminal UE #1 and user terminal UE #2 that execute type 2 discovery cut off, from the top of each OFDM symbol's receiving timing, the signal over the length of the CP length, and use the remaining portion for the detection of discovery signals. Consequently, the discovery signals transmitted from user terminal UE #3 and user terminal UE #4 that execute type 1 discovery do not interfere with the discovery signals transmitted from user terminal UE #1 and user terminal UE #2 that execute type 2 discovery.

As described above, with the D2D discovery resource allocation method according to the first example, it is possible to prevent producing inter-symbol interference from discovery signals against cellular uplink signals, by allocating a type 2 discovery resources immediately after type 1 discovery resources in a row.

Also, it is possible to prevent inter-symbol interference from discovery signals transmitted in type 1 discovery against discovery signals transmitted in type 2 discovery, by using extended cyclic prefixes in the type 2 discovery resources. Furthermore, it is not necessary to provide guard times immediately after type 1 discovery resource areas.

SECOND EXAMPLE

With a second example, the method of reporting type 1/2 discovery resource areas from a radio base station to user terminals will be described.

User terminals that carry out inter-terminal direct communication transmit discovery signals by using only one of type 1 discovery resources and type 2 discovery resources. User terminals that carry out inter-terminal direct communication receive discovery signals transmitted from other user terminals in both the type 1 discovery resource area and the type 2 discovery resource area.

Consequently, the radio base station needs to report a D2D discovery resource area that includes both the type 1 discovery resource area and the type 2 discovery resource area to the user terminals, for receipt. Alternatively, the radio base station needs to report part of the D2D discovery resource area to the user terminals, for transmission. That is, the radio base station needs to report the type 1 discovery resource area to user terminals that execute type 1 discovery, for transmission. The radio base station needs to report UE-specific resources selected from the type 2 discovery resource area, to user terminals that execute type 2 discovery, for transmission.

Figure 4:
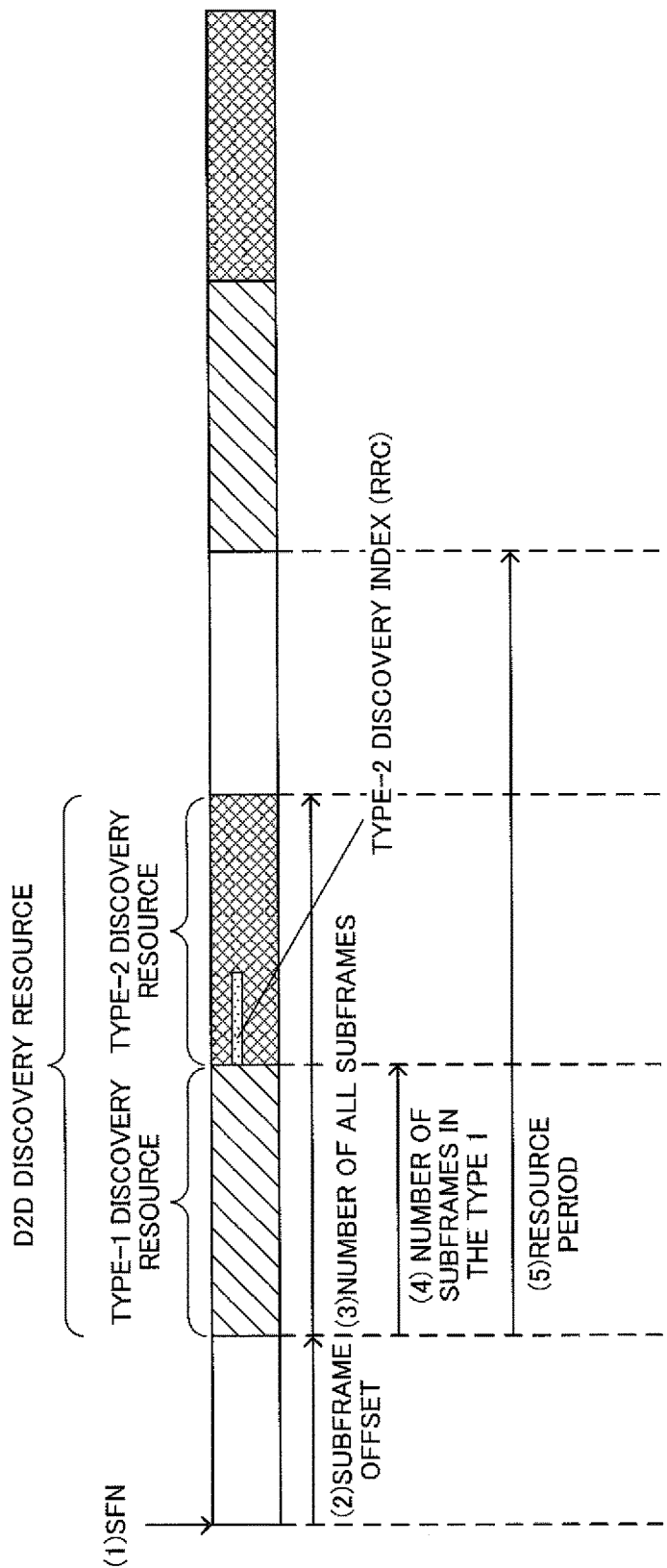
FIG. 4 is a diagram to explain information which a radio base station reports to a user terminals in a second example.

As shown in FIG. 4, the radio base station reports (1) the frame number (SFN: System Frame Number) at the starting timing of the D2D discovery resources, (2) the subframe offset value, (3) the number of subframes in the whole D2D discovery resources (the type 1 discovery resources and the type 2 discovery resources), (4) the number of subframes in the type 1 discovery resources, and (5) the resource period, to user terminals, through SIB (System Information Block) signaling.

Since the type 1 discovery resources and the type 2 discovery resources are allocated in a row, if (3) the number of subframes in the whole D2D discovery resources and (4) the number of subframes in the type 1 discovery resources above are reported, then the number of subframes in the type 2 discovery resources is also determined uniquely.

The radio base station reports the indices of UE-specific discovery signals transmission resources, among the type 2 discovery resources, to user terminals that execute type 2 discovery, individually, by way of RRC (Radio Resource Control) signaling.

As described above, according to the D2D discovery resource reporting method of the second example, the whole type 1/2 discovery resource areas and the type 1 discovery resource area are broadcast through SIB signaling, so that even user terminals in RRC idle mode can detect other user terminals that execute both type 1/2 discoveries.

Furthermore, since it is fixed that the type 2 discovery resource area is allocated immediately after the type 1 discovery resource area in a row, the radio base station has only to report the number of subframes in the whole D2D discovery resources and the number of subframes in the type 1 discovery resources, and the user terminal can determine the number of subframes in the type 2 discovery resources uniquely.

(Structure of Radio Communication System)

Now, a structure of a radio communication system according to the present embodiment will be described below. In this radio communication system, the radio communication methods according to the first example and the second example are employed.

Figure 5:
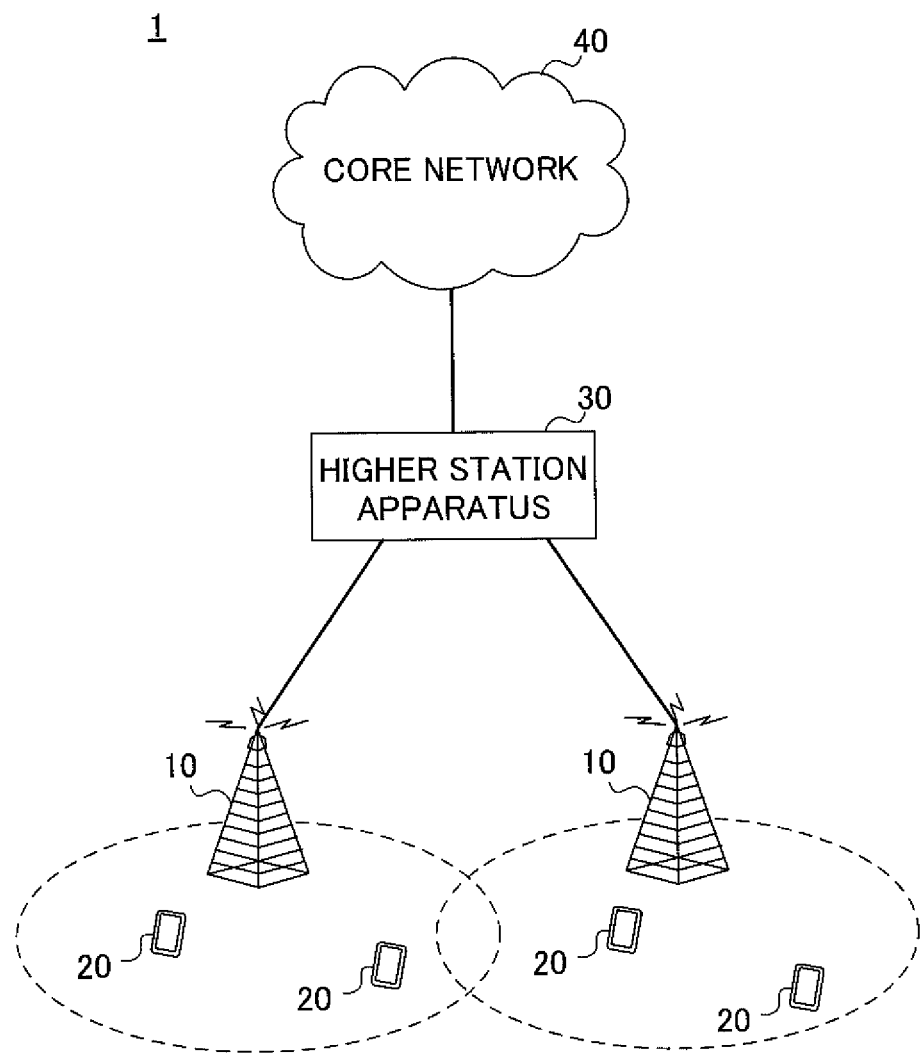
FIG. 5 is a schematic diagram to show an example of a radio communication system according to the present embodiment.

FIG. 5 is a schematic structure diagram to show an example of the radio communication system according to the present embodiment. As shown in FIG. 5, the radio communication system 1 includes a plurality of radio base stations 10, and a plurality of user terminals 20 that are present in the cells formed by the radio base stations 10 and that can communicate with each radio base station 10. The radio base stations 10 are each connected with a higher station apparatus 30, and are connected to a core network 40 via the higher station apparatus 30.

The radio base stations 10 are radio base stations having predetermined coverages. Note that a radio base station 10 may be a macro base station having a relatively wide coverage (eNodeB, macro base station, aggregation node, transmission point, transmitting/receiving point, etc.), or may be a small base station having a local coverage (small base station, pico base station, femto base station, HeNB (Home eNodeB), RRH (Remote Radio Head), micro base station, transmission point, transmitting/receiving point, etc.).

The user terminals 20 are terminals to support various communication schemes such as LTE, LTE-A and so on, and may include both mobile communication terminals and stationary communication terminals. A user terminal 20 can communicate with other user terminals 20 via the radio base stations 10. Also, a user terminal 20 can directly communicate with other user terminals 20 (D2D) without involving the radio base stations 10.

The higher station apparatus 30 may be, for example, an access gateway apparatus, a radio network controller (RNC), a mobility management entity (MME) and so on, but is by no means limited to these.

Also, in the radio communication system 1, a downlink shared channel (PDSCH: Physical Downlink Shared Channel), which is used by each user terminal 20 on a shared basis, downlink control channels (PDCCH (Physical Downlink Control Channel) and EPDCCH (Enhanced Physical Downlink Control Channel)), a broadcast channel (PBCH) and so on are used as downlink channels. User data, higher layer control information and predetermined SIB s (System Information Blocks) are communicated by the PDSCH. Downlink control information (DCI) is communicated by the PDCCH and the EPDCCH.

Also, in the radio communication system 1, an uplink shared channel (PUSCH: Physical Uplink Shared Channel) that is used by each user terminal 20 on a shared basis, an uplink control channel (PUCCH: Physical Uplink Control Channel) and so on are used as uplink channels. User data and higher layer control information are communicated by the PUSCH.

In the radio communication system 1, discovery signals for allowing the user terminals 20 to detect each other are transmitted on the uplink.

Figure 6:
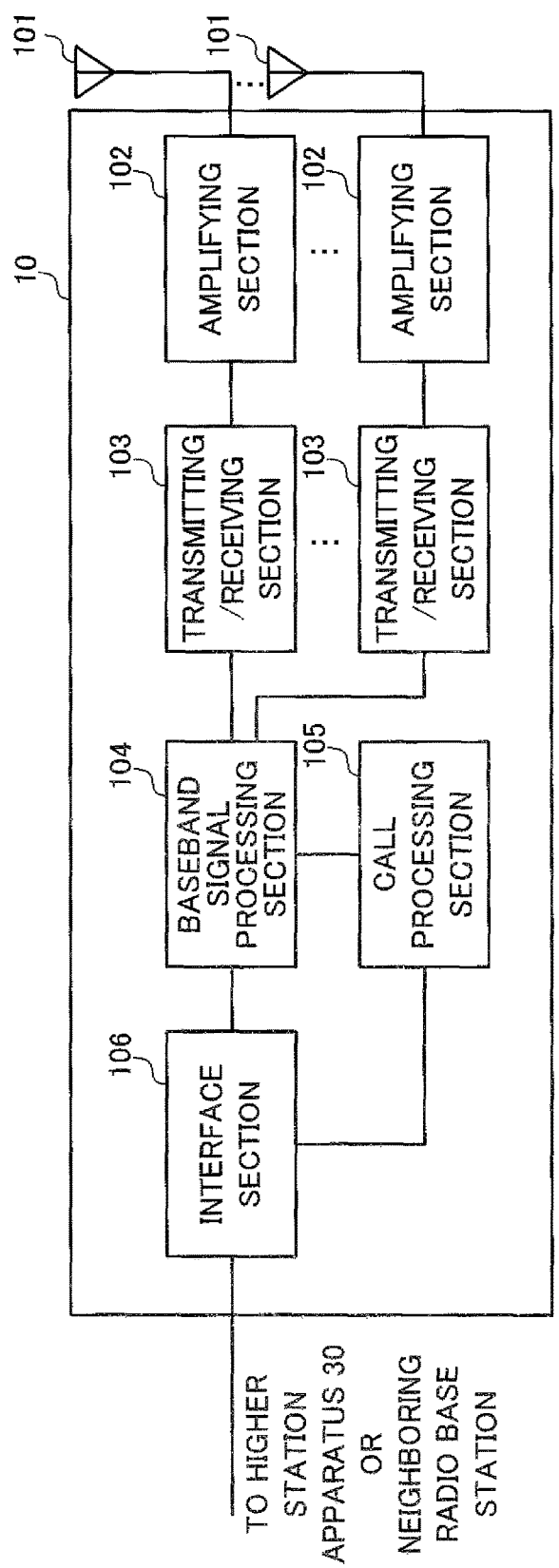
FIG. 6 is a diagram to explain an overall structure of a radio base station according to the present embodiment.

FIG. 6 is a diagram to show an overall structure of a radio base station 10 according to the present embodiment. The radio base station 10 has a plurality of transmitting/receiving antennas 101 for MIMO (Multiple Input Multiple Output) communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

The baseband signal processing section 104 performs a PDCP (Packet Data Convergence Protocol) layer process, division and coupling of user data, RLC (Radio Link Control) layer transmission processes such as an RLC retransmission control transmission process, MAC (Medium Access Control) retransmission control, including, for example, an HARQ (Hybrid Automatic Repeat reQuest) transmission process, scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and the result is forwarded to each transmitting/receiving section 103.

Each transmitting/receiving section 103 converts downlink signals, which are pre-coded and output from the baseband signal processing section 104 on a per antenna basis, into a radio frequency band. The amplifying sections 102 amplify the radio frequency signals having been subjected to frequency conversion, and transmit the resulting signals through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

Each transmitting/receiving section 103 reports information about the allocation of D2D discovery resource areas to each user terminal 20. Each transmitting/receiving section 103 transmits, to user terminals 20 that execute type 2 discovery, information about the initially allocated locations of the resources for transmitting the discovery signals for use in D2D discovery.

In the baseband signal processing section 104, the user data that is included in the input uplink signals is subjected to a fast Fourier transform (FFT) process, an inverse discrete Fourier transform (IDFT) process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base stations 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 7:
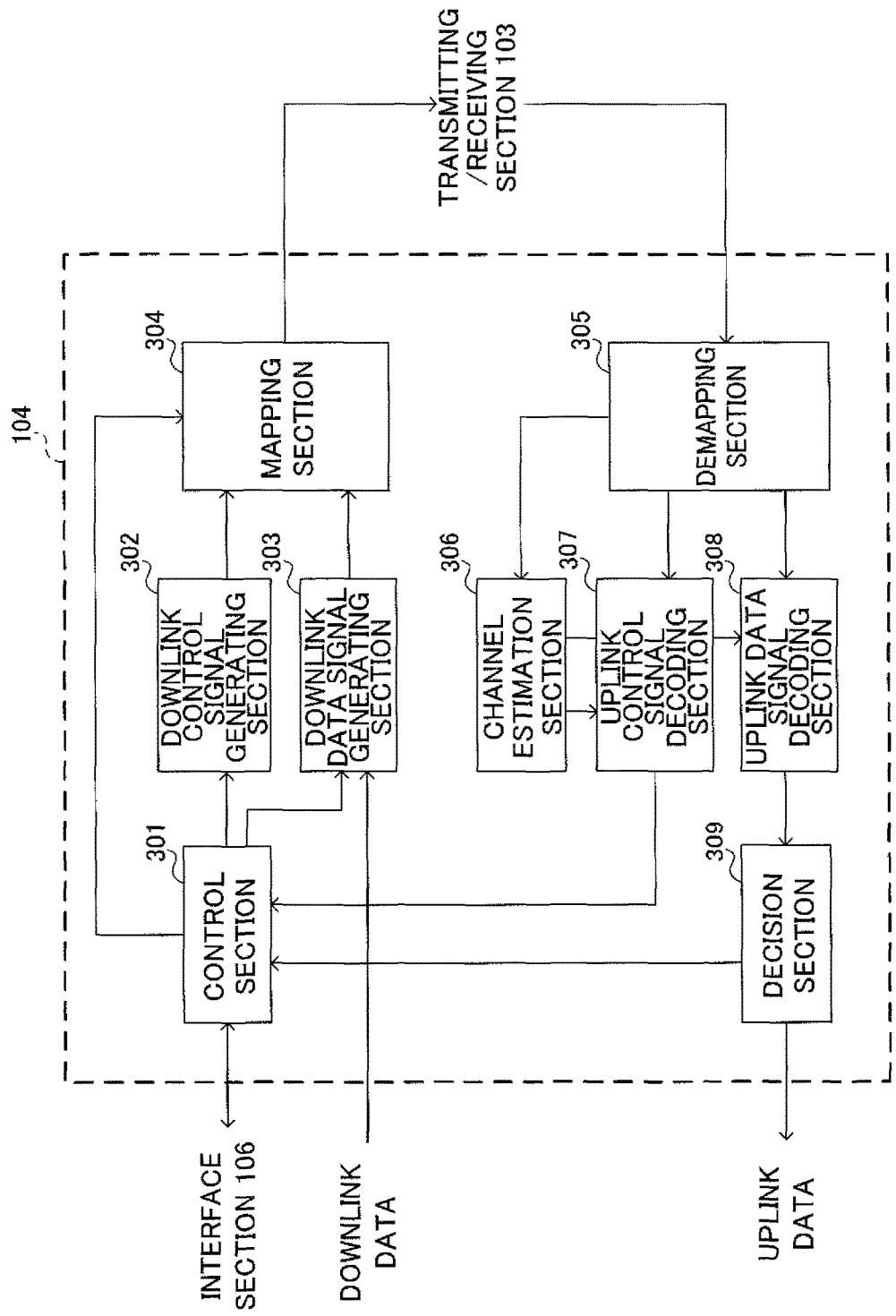
FIG. 7 is a diagram to explain a functional structure of a radio base station according to the present embodiment.

FIG. 7 is a diagram to show a principle functional structure of the baseband signal processing section 104 provided in the radio base station 10 according to the present embodiment. As shown in FIG. 7, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is communicated in the PDSCH, downlink control information that is transmitted in one or both of the PDCCH and the enhanced PDCCH (EPDCCH), downlink reference signals and so on. Also, the control section 301 also controls the scheduling of RA (Random Access) preambles that are communicated in the PRACH (Physical Random Access Channel), uplink data that is communicated in the PUSCH, uplink control information that is communicated in the PUCCH or the PUSCH and uplink reference signals (allocation control). Information about the allocation control of uplink signals (uplink control signals, uplink user data, etc.) is reported to the user terminal 20 by using a downlink control signal (DCI).

The control section 301 controls the allocation of radio resources to downlink signals and uplink signals based on command information from the higher station apparatus 30, feedback information from each user terminal 20 and so on. That is, the control section 301 functions as a scheduler.

The control section 301 configures a D2D discovery resource area by allocating a type 2 discovery resource area immediately after a type 1 discovery resource area, in a row. The control section 301 configures extended cyclic prefixes in one or a plurality of OFDM symbols at a beginning of the subframe set constituting the type 2 discovery resources. The control section 301 allocates the type 2 resources to type 2 UEs, separately.

The downlink control signal generating section 302 generates downlink control signals (which may be both the PDCCH signal and the EPDCCH signal, or may be one of these) that are determined to be allocated by the control section 301. To be more specific, the downlink control signal generating section 302 generates a DL assignment, which reports downlink signal allocation information, and a UL grant, which reports uplink signal allocation information, based on commands from the control section 301.

The downlink data signal generating section 303 generates downlink data signals (PDSCH signals) that are determined to be allocated to resources by the control section 301. The data signals generated in the downlink data signal generating section 303 are subjected to a coding process and a modulation process, using coding rates and modulation schemes that are determined based on CSI (Channel State Information) from each user terminal 20 and so on.

The mapping section 304 controls the allocation of the downlink control signals generated in the downlink control signal generating section 302 and the downlink data signals generated in the downlink data signal generating section 303 to radio resources, based on commands from the control section 301.

The demapping section 305 demaps an uplink signal transmitted from the user terminal 20 and separates the uplink signal. The channel estimation section 306 estimates channel states from the reference signals included in the received signal separated in the demapping section 305, and outputs the estimated channel states to the uplink control signal decoding section 307 and the uplink data signal decoding section 308.

The uplink control signal decoding section 307 decodes the feedback signals (delivery acknowledgement signals and/or the like) transmitted from the user terminals in the uplink control channel (PRACH, PUCCH, etc.), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (A/N (Acknowledgement/Negative acknowledgement) decisions) based on the decoding results in the uplink data signal decoding section 308, and outputs results to the control section 301.

Figure 8:
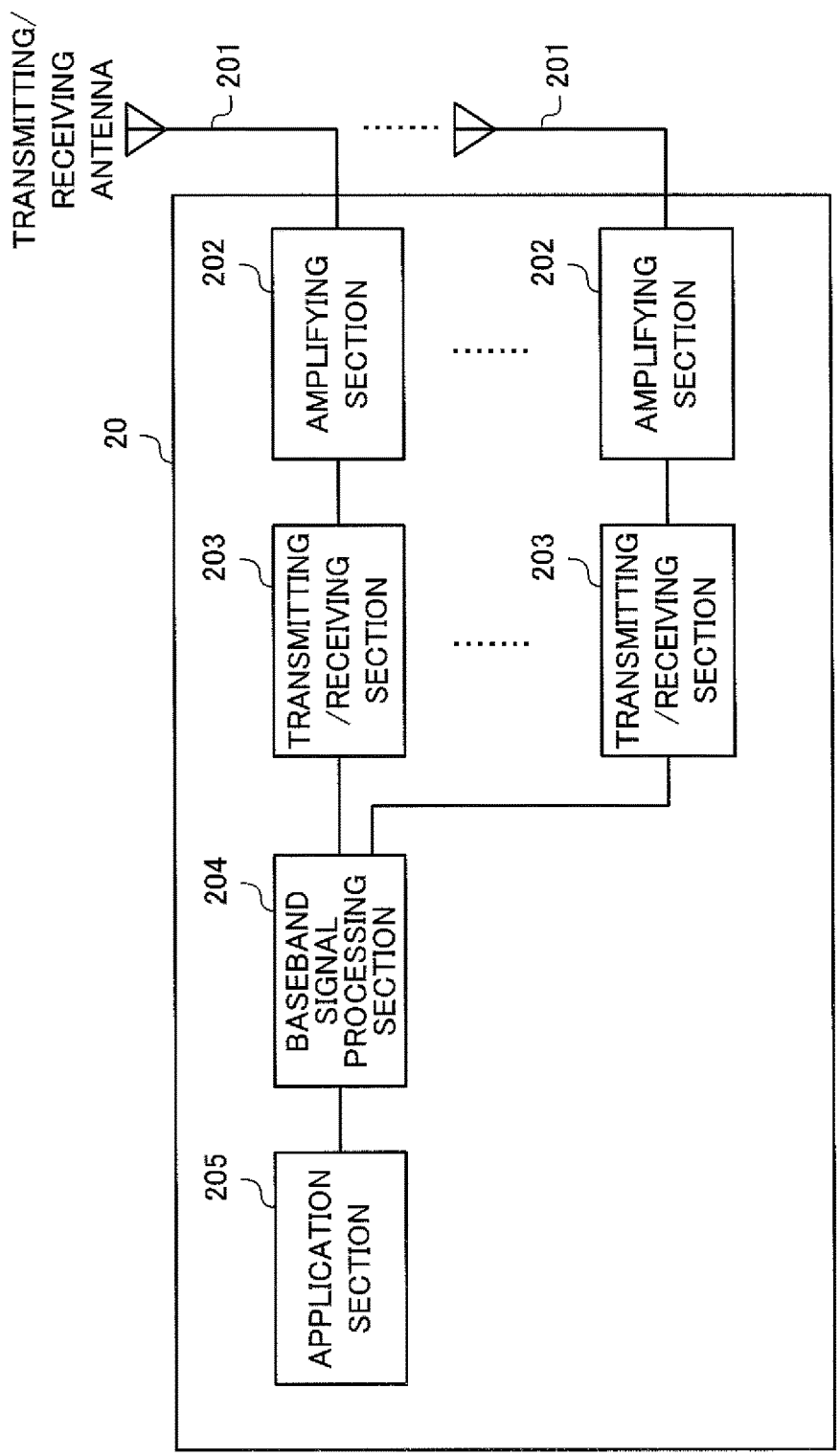
FIG. 8 is a diagram to explain an overall structure of a user terminal according to the present embodiment.

FIG. 8 is a diagram to show an overall structure of a user terminal 20 according to the present embodiment. As shown in FIG. 8, the user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and converted into the baseband signal through frequency conversion in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control (HARQ) transmission process, channel coding, pre-coding, a DFT (Discrete Fourier Transform) process, an IFFT process and so on, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

The transmitting/receiving section 203 receives information about the allocation of D2D discovery resource areas from the radio base station 10. The transmitting/receiving section 203 transmits the discovery signal for D2D discovery based on the information about the allocation of D2D discovery resource areas. The transmitting/receiving section 203 receives D2D discovery signals transmitted from other user terminals 20.

Figure 9:
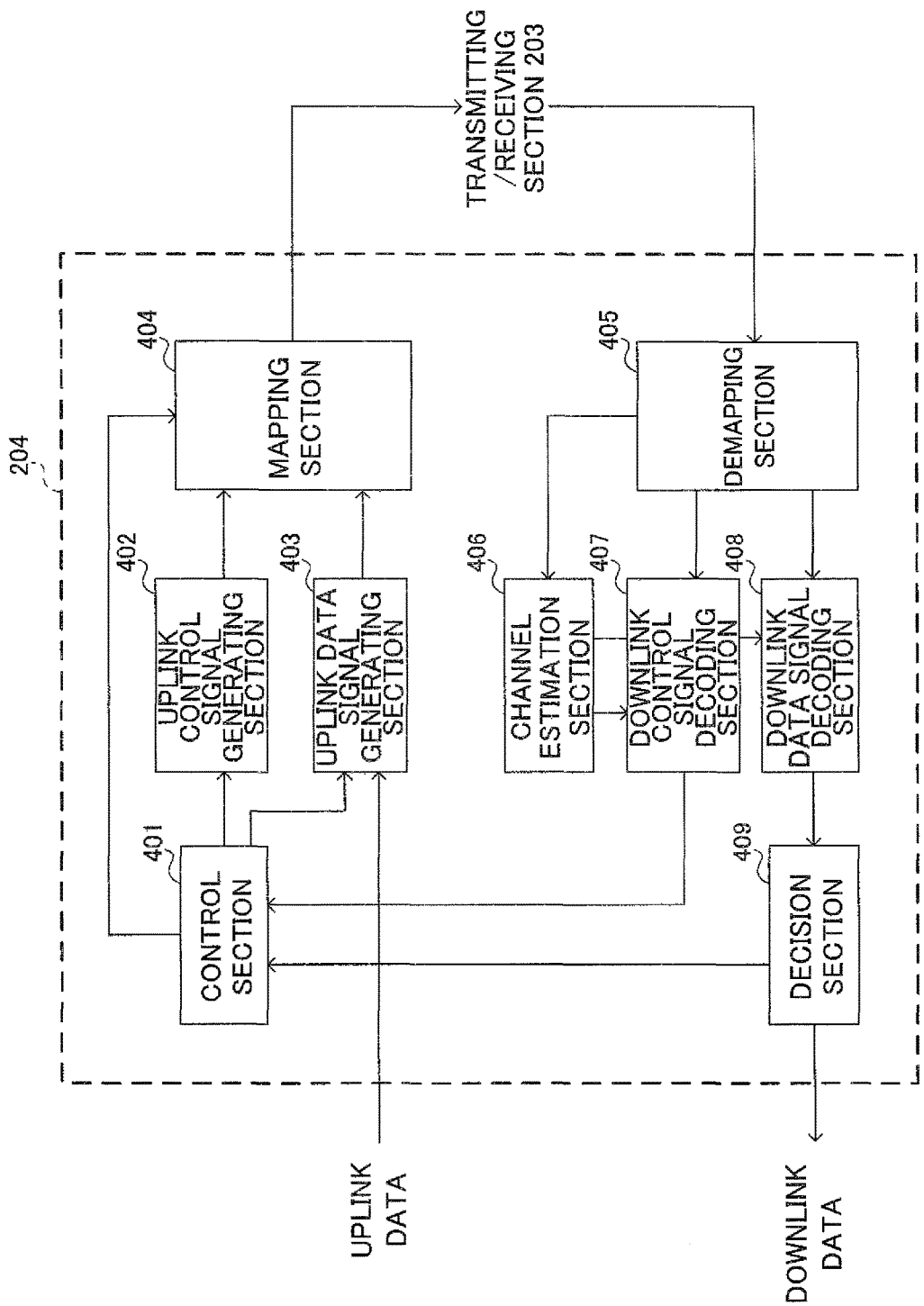
FIG. 9 is a diagram to explain a functional structure of a user terminal according to the present embodiment.

FIG. 9 is a diagram to show a principle functional structure of the baseband signal processing section 204 provided in the user terminal 20. As shown in FIG. 9, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals and so on) and uplink data signals based on downlink control signals (PDCCH signals) transmitted from the radio base station, retransmission control decisions with respect to the PDSCH signals received, and so on. The downlink control signals received from the radio base station are output from the downlink control signal decoding section 408, and the retransmission control decisions are output from the decision section 409.

From the number of subframes in the whole D2D discovery resources and the number of subframes in the type 1 discovery resources, included in the D2D discovery resource area allocation information, the control section 401 determines the structure of the type 2 discovery resource area.

The uplink control signal generating section 402 generates uplink control signals (feedback signals such as delivery acknowledgement signals, channel state information (CSI) and so on) based on commands from the control section 401. The uplink data signal generating section 403 generates uplink data signals based on commands from the control section 401. Note that, when an uplink grant is contained in a downlink control signal reported from the radio base station, the control section 401 commands the uplink data signal 403 to generate an uplink data signal.

The mapping section 404 controls the allocation of the uplink control signals (delivery acknowledgment signals and so on) and the uplink data signals to radio resources (PUCCH, PUSCH, etc.) based on commands from the control section 401. The mapping section 404 controls the allocation of the discovery signal for D2D discovery to resources in the type 2 resource group, based on commands from the control section 401.

The demapping section 405 demaps a downlink signal transmitted from the radio base station 10 and separates the downlink signal. The channel estimation section 407 estimates channel states from the reference signals included in the received signal separated in the demapping section 406, and outputs the estimated channel states to the downlink control signal decoding section 407 and the downlink data signal decoding section 408.

The downlink control signal decoding section 407 decodes the downlink control signal (PDCCH signal) transmitted in the downlink control channel (PDCCH), and outputs scheduling information (information regarding the allocation to uplink resources) to the control section 401. Also, if information related to the cells for feeding back delivery acknowledgment signals and information as to whether or not RF (Radio Frequency) tuning is applied are included in downlink control signals, these pieces of information are also output to the control section 401.

The downlink data signal decoding section 408 decodes the downlink data signal transmitted in the downlink shared channel (PDSCH), and outputs the result to the decision section 409. The decision section 409 makes a retransmission control decision (A/N decision) based on the decoding result in the downlink data signal decoding section 408, and outputs the result to the control section 401.

The control section 401 detects other communicable user terminals 20 based on the discovery signals for D2D discovery transmitted from other user terminals 20.

Note that the present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2013-227341, filed on Oct. 31, 2013, including the specification, drawings and abstract, is incorporated herein by reference in its entirety.

The invention claimed is:

1. A user terminal comprising:
a receiver that receives configuration information about a first type discovery resource including a resource that is selectable for allocation of a discovery signal to discover a terminal and a second type discovery resource including a resource to allocate with a discovery signal based on specifying information by System Information Block (SIB) signaling and receives the specifying information by Radio Resource Control (RRC) signaling; and
a processor that controls resource allocation of the discovery signal.

2. The user terminal according to claim 1, wherein the processor allocates the discovery signal to either the first type discovery resource or the second type discovery resource.

3. The user terminal according to claim 1, wherein the receiver receives the discovery signal from another user terminal via a resource group.

4. The user terminal according to claim 2, wherein the receiver receives the discovery signal from another user terminal via a resource group.

5. The user terminal according to claim 1, wherein the configuration information includes at least one of a frame number (SFN: System Frame Number) of a starting timing of a resource group, a subframe offset value, a number of subframes of the resource group, and a number of subframes of the first type discovery resource and a resource period.

6. The user terminal according to claim 2, wherein the configuration information includes at least one of a frame number (SFN: System Frame Number) of a starting timing of a resource group, a subframe offset value, a number of subframes of the resource group, and a number of subframes of the first type discovery resource and a resource period.

7. The user terminal according to claim 1, wherein in a resource group, the second type discovery resource is allocated in a time direction, immediately after the first type discovery resource.

8. The user terminal according to claim 2, wherein in a resource group, the second type discovery resource is allocated in a time direction, immediately after the first type discovery resource.

9. The user terminal according to claim 1, wherein in the second type discovery resource, an extended cyclic prefix is configured in a first or in multiple Orthogonal Frequency-Division Multiplexing (OFDM) symbols.

10. The user terminal according to claim 2, wherein in the second type discovery resource, an extended cyclic prefix is configured in a first or in multiple Orthogonal Frequency-Division Multiplexing (OFDM) symbols.

11. A radio base station comprising:
a transmitter that transmits configuration information about a first type discovery resource including a resource that is selectable for allocation of a discovery signal to discover a terminal and a second type discovery resource including a resource to allocate with a discovery signal based on specifying information by System Information Block (SIB) signaling and transmits the specifying information by Radio Resource Control (RRC) signaling; and
a processor that allocates any resource of the second type discovery resource to a terminal.

12. A radio communication method for a user terminal, comprising:
receiving configuration information about a first type discovery resource including a resource that is selectable for allocation of a discovery signal to discover a terminal and a second type discovery resource including a resource to allocate with a discovery signal based on specifying information by System Information Block (SIB) signaling and receives the specifying information by Radio Resource Control (RRC) signaling; and
controlling resource allocation of the discovery signal.

* * * * *